United States Patent [19]

Iwasaki

[11] Patent Number: 5,645,461
[45] Date of Patent: Jul. 8, 1997

[54] METHOD OF MANUFACTURING PROJECTION CATHODE RAY TUBE WITH UNIFORM OPTICAL MULTIPLE INTERFERENCE FILM

[75] Inventor: Yasuo Iwasaki, Nagaokakyo, Japan

[73] Assignee: Mitsubishi Denki Kabushiki Kaisha, Tokyo, Japan

[21] Appl. No.: 266,110

[22] Filed: Jun. 27, 1994

Related U.S. Application Data

[62] Division of Ser. No. 29,935, Mar. 10, 1993, abandoned, which is a continuation of Ser. No. 747,865, Aug. 20, 1991, abandoned.

[30] Foreign Application Priority Data

Aug. 20, 1990 [JP] Japan ................................. 2-219532

[51] Int. Cl.$^6$ .................................................. H01J 29/89
[52] U.S. Cl. .................................. 445/11; 313/474
[58] Field of Search .............................. 313/474, 477 R; 445/11, 23

[56] References Cited

U.S. PATENT DOCUMENTS

| | | | |
|---|---|---|---|
| 4,021,850 | 5/1977 | Rogers | 313/477 R X |
| 4,393,329 | 7/1983 | Lehnert | 313/477 R |
| 4,405,949 | 9/1983 | Hockenbrock et al. | 358/237 |
| 4,634,926 | 1/1987 | Vriens et al. | 313/474 |
| 4,642,695 | 2/1987 | Iwasaki | 358/237 |
| 4,683,398 | 7/1987 | Vriens et al. | 313/474 |
| 4,755,868 | 7/1988 | Hodges | 313/474 X |
| 4,804,884 | 2/1989 | Vriens et al. | 313/474 |
| 4,904,899 | 2/1990 | Nakata et al. | 313/447 R |
| 4,914,510 | 4/1990 | Brennesholtz et al. | 313/478 X |

FOREIGN PATENT DOCUMENTS

| | | |
|---|---|---|
| 0361575A1 | 4/1990 | European Pat. Off. |
| 60-257043 | 12/1985 | Japan. |
| 423051 | 2/1992 | Japan. |
| 2149203 | 6/1985 | United Kingdom. |

*Primary Examiner*—Sandra L. O'Shea
*Assistant Examiner*—Matthew J. Esserman

[57] ABSTRACT

To manufacture a cathode-ray projection tube, a glass face panel with a skirt portion is provided. The glass face panel is formed to satisfy the following formula $0.85 \leq B/A$, where A is a long edge length of the inner surface of the glass face panel and B is a short edge length of the inner surface of the glass face panel. Then, high and low refraction materials are alternately evaporated to form an optical multiple layered interference film having a substantially uniform thickness on the inner surface of the glass face panel.

9 Claims, 7 Drawing Sheets

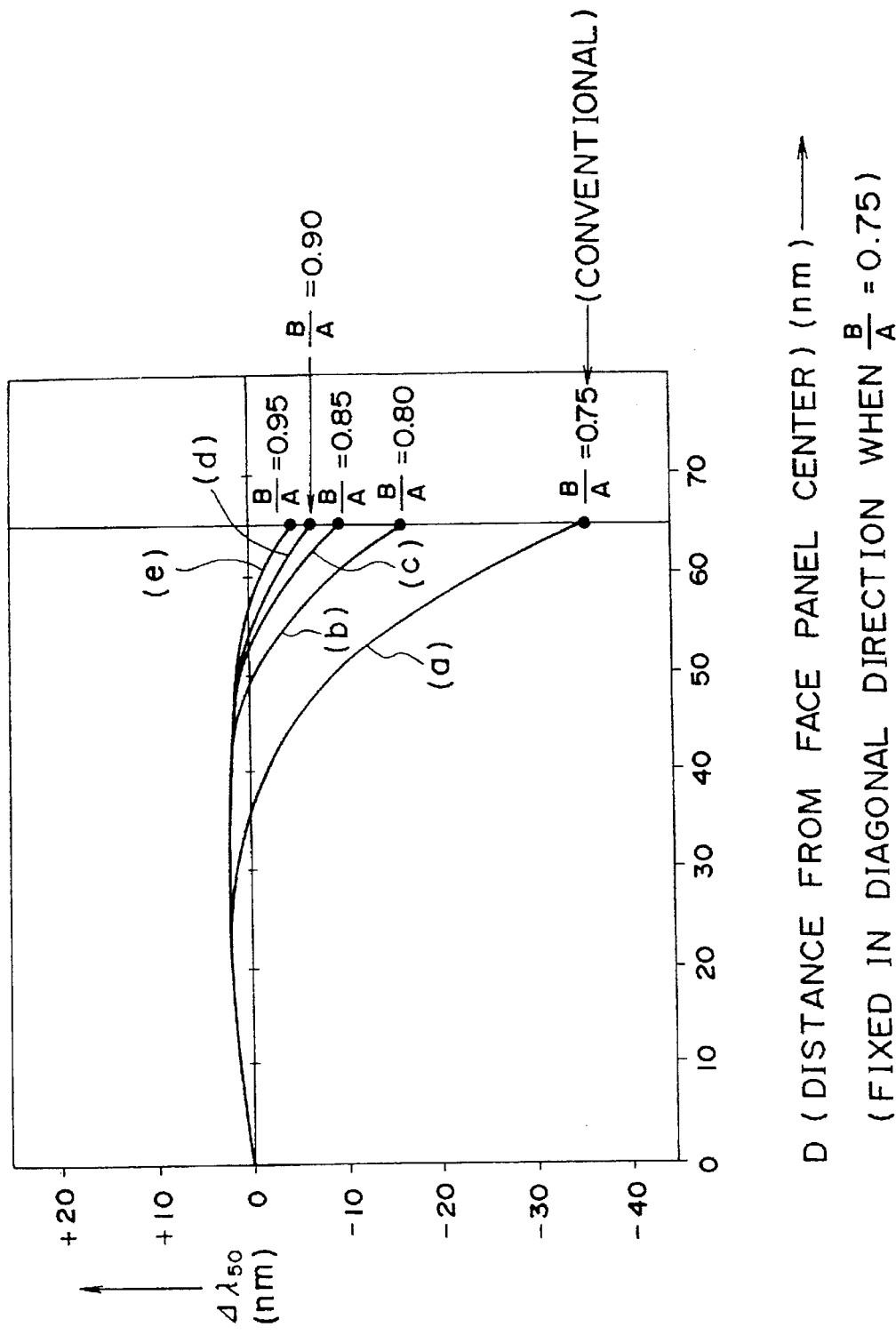

METHOD OF MANUFACTURING PROJECTION CATHODE RAY TUBE WITH UNIFORM OPTICAL MULTIPLE INTERFERENCE FILM

This application is a divisional application of application Ser. No. 08/029,935 filed on Mar. 10, 1993, now abandoned, which is a continuation of application Ser. No. 07/747,865, filed on Aug. 20, 1991, now abandoned.

BACKGROUND OF THE INVENTION i) Field of the Invention

The present invention relates to manufacturing a projection cathode-ray tube with a uniform optical multiple layered interference film for use in a projection television set having a superior white uniformity of a reproduced image for projecting an enlarged image of an image reproduced onto a fluorescent surface or plate of the cathode-ray tube on a screen located in front of the cathode-ray tube through a projection lens arranged between the fluorescent plate of the cathode-ray tube and the screen.

ii) Description of the Related Arts

Conventionally, a method for improving a beam-condensing rate when a light beam emitted by a projection cathode-ray tube for each primary color is introduced into a projection lens unit in a projection television set, is disclosed in U.S. Pat. No. 4,642,695.

In a usual cathode-ray tube, a light beam emitted from a fluorescent surface or plate is almost perfectly diffused light. On the other hand, in a projection television set, only the light components within a divergent angle of ±30° of the light beam emitted from the fluorescent plate of a cathode-ray tube can be introduced into a method of manufacturing a projection lens unit and be used effectively. The other light components become useless light. These useless light components bring about various drawbacks. For example, the useless light components are reflected by the lens-barrel of the projection lens unit to become stray light. In this respect, in the aforementioned U.S. Pat. No. 4,642,695, more than 30% of all luminous flux emitted from an emission point in a fluorescent plate is concentrated into a conical body within a divergent angle of ±30° in order to largely improve the image brightness on the screen in the projection television set.

Further, in Japanese patent laid-open No. Sho 60-257043, as one embodiment of the invention in U.S. Pat. No. 4,642,695, a cathode-ray tube having an optical multiple layered interference film composed of a plurality of laminate layers formed by alternately laminating high and low refraction materials between a glass face panel and a fluorescent plate is disclosed. In this instance, one embodiment of a six-layer optical multiple layered interference film using tantalum pentoxide $Ta_2O_5$ and silicon dioxide $SiO_2$ as the respective high and low refraction materials is described.

In FIG. 1, there is shown a conventional projection cathode-ray tube 1 with an optical multiple layered interference film. In the projection cathode-ray tube 1 with the optical multiple layered interference film, a glass face panel 2 and a glass funnel 3 constitute a vacuum vessel. An electron gun 5 for emitting an electron-beam for exciting a fluorescent plate is sealed in a neck portion 4 of the glass funnel 3. On the inner surface of the glass face panel 2, there are successively provided an optical multiple layered interference film 6 for giving directivity to the light radiation from the fluorescent plate to concentrate the light radiation, a fluorescent body layer 7 to be luminous due to the excitement by the electron-beam from the electron gun 5, and a metal back film 8 For reflecting the luminescence of the fluorescent body layer 7 forwards with as high an efficiency as possible to increase the light output. The optical multiple layered interference film 6, the fluorescent body layer 7 and the metal back film 8 constitute the fluorescent plate.

In FIG. 2, there is shown a part of the fluorescent plate and the glass face panel 2 shown in FIG. 1. In this case, the optical multiple layered interference film 6 has the structure of a six-layer laminate film formed by alternately laminating the high and low refraction materials H and L of tantalum pentoxide $Ta_2O_5$ and silicon dioxide $SiO_2$, respectively.

As is apparent from FIG. 1, the inner surface of the glass face panel 2 of the projection cathode-ray tube 1 with the optical multiple layered interference film is usually formed with a curved surface and the curvature radius R along the diagonal screen axis is often selected to be approximately 350 mm. By utilizing this inside convex curved surface, the radiation from the peripheral portion of the fluorescent plate of the projection cathode-ray tube can be introduced into the projection lens unit with high efficiency, and a uniform brightness of the projected image can be ensured. Further, the glass face panel 2 is provided with a skirt portion 9 of a side wall portion parallel with the axis direction, and the skirt portion 9 is connected to the end surface of the glass funnel 3 by a glass frit 10.

The skirt portion 9 is essential for the following two reasons. That is, firstly, when no skirt portion 9 is provided, a large vacuum stress exists in the vicinity of the junction surface by the glass frit 10, and the mechanical strength of the projection cathode-ray tube 1 becomes very weak. Secondly, when there is no skirt portion 9 in the manufacturing process of the fluorescent plate or the like, handling becomes very difficult.

In FIG. 3, there is shown a vacuum evaporator 20 for forming the optical multiple layered interference film 6 on the inner surface of the glass face panel 2. In a bell jar 20 as a vacuum vessel, the gas is discharged by a vacuum pump 22, and the inside of the bell jar 20 is kept in a very high vacuum state. Within the bell jar 20, the glass face panels 2 having the optical multiple layered interference film formed on them are mounted on a support plate 24 supported by support legs 23. The glass face panels 2 are heated over 350° C. by heaters 25. By heating the evaporation surfaces of the glass face panels 2, a stable and strong optical multiple layered interference film can be formed.

A fixed evaporation source 26 of tantalum pentoxide $Ta_2O_5$ and a fixed evaporation source 27 of silicon dioxide $SiO_2$, are heated for evaporating by the electron-beam. When the inside of the bell jar 21 reaches a predetermined degree of vacuum and the temperature of the glass face panels 2 within the bell jar 21 reaches a predetermined value, the evaporation source 26 of tantalum pentoxide $Ta_2O_5$ is actuated by the electron-beam, and tantalum pentoxide $Ta_2O_5$ vapor is emitted from the evaporation source 26 in the bell jar 21 and adheres to the inner surface of the glass face panels 2 to form a vacuum evaporation film of tantalum pentoxide $Ta_2O_5$ thereon. At this time, in order to obtain a stable vacuum evaporation film of the tantalum pentoxide $Ta_2O_5$, a certain amount of oxygen gas $O_2$ can be introduced in the bell jar 21 during the evaporation process.

In order to obtain the necessary optical characteristics of the optical multiple layered interference film, the thickness of the evaporation film should be strictly controlled. Therefore, the thickness of the evaporation film adhered to an evaporation film thickness monitor plate 29 is measured by an evaporation film thickness controller 28 to carry out a film thickness control. When the film thickness of the tantalum pentoxide $Ta_2O_5$ of the first layer has reached a predetermined thickness, the action of the evaporation source 26 is stopped. Then, the evaporation source 27 of silicon dioxide $SiO_2$ is actuated to form a vacuum evaporation film of silicon dioxide $SiO_2$ being the second layer having a predetermined thickness on the evaporation film of the tantalum pentoxide $Ta_2O_5$ of the first layer in the same manner as the evaporation source 26 of the tantalum pentoxide $Ta_2O_5$. These operations are repeated to form the optical multiple layered interference film 6 having six layers alternately laminated with the high refraction material of tantalum pentoxide $Ta_2O_5$ and the low refraction material of silicon dioxide $SiO_2$ on the inner surface of the glass face panel 2.

In the conventional projection cathode-ray tube with the optical multiple layered interference film, as described above, the thickness of the optical multiple layered interference film 6 formed on the inner surface of the glass face panel 2 is uneven at the periphery, in particular, the diagonal peripheral portions of the glass face panel 2, and the optical characteristics of the optical multiple layered interference film 6 are insufficient in those portions. As a result, the desired luminescence characteristics of the projection cathode-ray tube 1 with the optical multiple layered interference film cannot be obtained in the diagonal peripheral portions of the fluorescent plate, and hence an abnormality is caused in the white uniformity of the image reproduced in the projection television set.

The cause of the abnormality in the white uniformity will now be described in detail in connection with FIG. 4. In FIG. 4, there are shown cross sections AA, BB and CC of the glass face panel 2, taken along the lines in the directions of a long axis diameter A, a short axis diameter B and a diagonal axis diameter C, respectively. Relating to the optical multiple layered interference film 6 formed on the inner surface of the glass face panel 2, the thickness becomes fairly thin particularly in the diagonal peripheral portions 30 compared with the central portion of the glass face panel 2. This is caused by obstructing the uniform adhesion of the refraction material vapor onto the inner surface of the glass face panel 2 under the influence of the skirts 9 such as long side skirts 9a of long sides 2a and short side skirts 9b of short sides 2b of the glass face panel 2 in the diagonal peripheral portions 30 when the vacuum evaporation of the high and low refraction materials onto the glass face panel 2 is carried out.

In FIG. 5, there is shown one example of the spectral transmittance property of the optical multiple layered interference film 6 formed on the inner surface of the glass face panel 2 on the normal-incidence of the light. This spectral transmittance property is represented by a value of a wavelength $\lambda_{50}$ at a point exhibiting 50% of spectral transmittance. A curve (I) shows the spectral transmittance at the central portion of the glass face panel 2, obtaining $\lambda_{50}$=490 nm. Further, a curve (II) shows the spectral transmittance at the diagonal portion 30 of the glass face panel 2. In this case, the evaporation film becomes uneven due to the influence of the skirts 9 to obtain $\lambda_{50}$=470 nm. Hence, the wavelength difference $\Delta\lambda_{50}$ between the wavelengths at the central and the diagonal portions is 20 nm. The limit value of the wavelength difference $\Delta\lambda_{50}$ is considered to be approximately 10 nm from various experiment results. As a result, when $\Delta\lambda_{50}$ becomes 20 nm, the desired luminescence characteristics of the projection cathode-ray tube 1 with the optical multiple layered interference film cannot be obtained in the diagonal peripheral portions of the fluorescent plate, and hence the abnormality is caused in the white uniformity of the image reproduced in the projection television set.

SUMMARY OF THE INVENTION

Accordingly, it is an object of the present invention to provide a projection cathode-ray tube having a uniform optical multiple layered interference film in view of the afore-mentioned drawbacks of the prior art, which is capable of realizing a projection television set having superior white uniformity of the reproduced image.

In accordance with one aspect of the present invention, there is provided a projection cathode-ray tube, comprising a glass face panel, a fluorescent layer formed on an inner surface of the glass face panel, and an optical multiple layered interference film formed between the glass face panel and the fluorescent layer, the optical multiple layered interference film including high and low refraction material layers alternately laminated one on top of the other, the glass face panel being formed to satisfy the following formula $$0.85 \leq B/A$$

wherein A is a long edge length of the inner surface of the glass face panel and B is a short edge length of the same.

BRIEF DESCRIPTION OF THE DRAWINGS

The above and other objects, features and advantages of the present invention will more fully appear from the following description of the preferred embodiments with reference to the accompanying drawings, in which:

FIG. 7 is a graphical representation showing the relationship between the distance from a glass face panel center and the wavelength difference $\Delta\lambda_{50}$ of 50% of spectral transmittance between the wavelengths $\lambda_{50}$ at central and diagonal portions.

DESCRIPTION OF THE PREFERRED EMBODIMENTS

Figure 1:
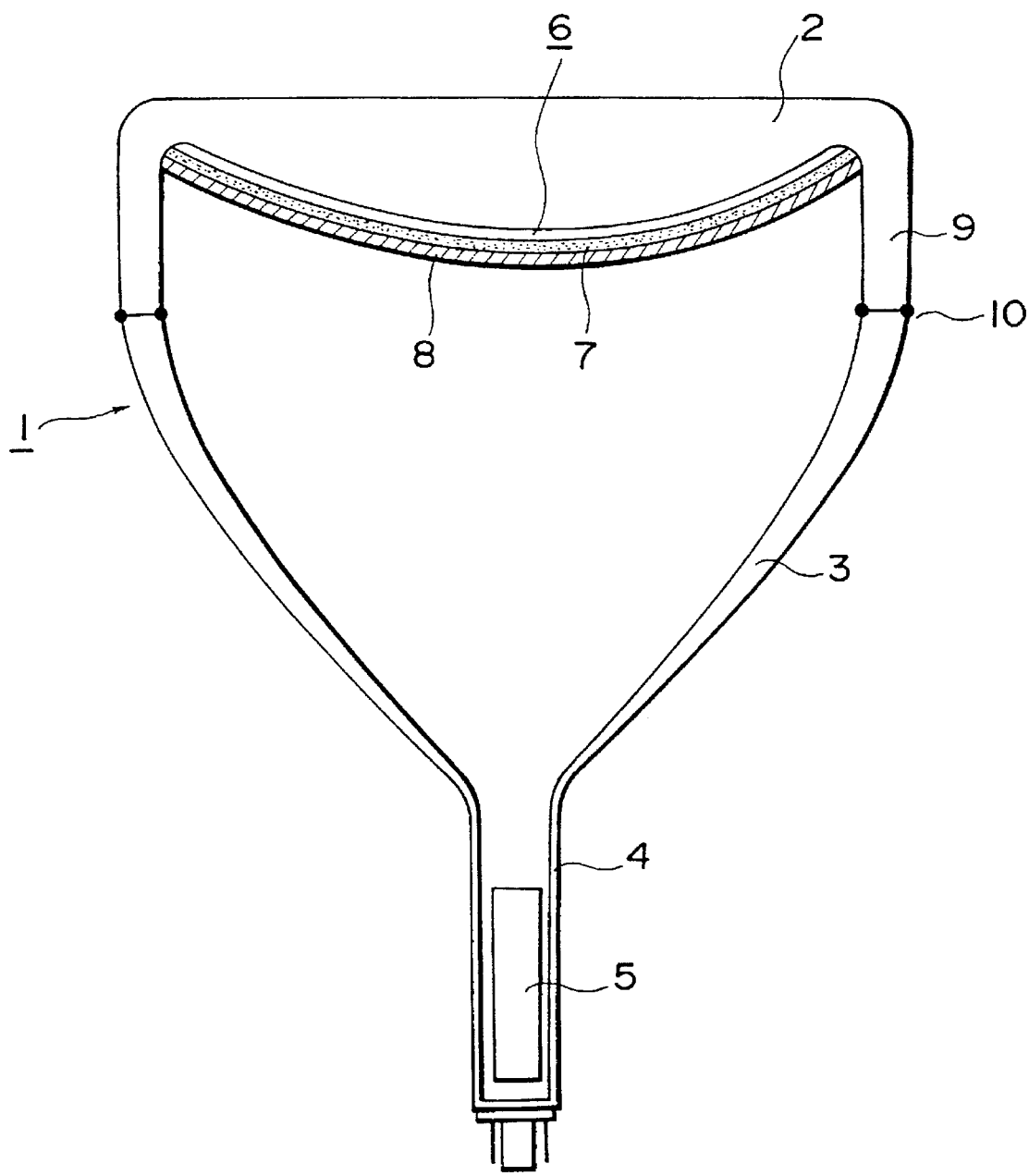
FIG. 1 is a schematic cross sectional view of a conventional projection cathode-ray tube with an optical multiple layered interference film.
Figure 2:
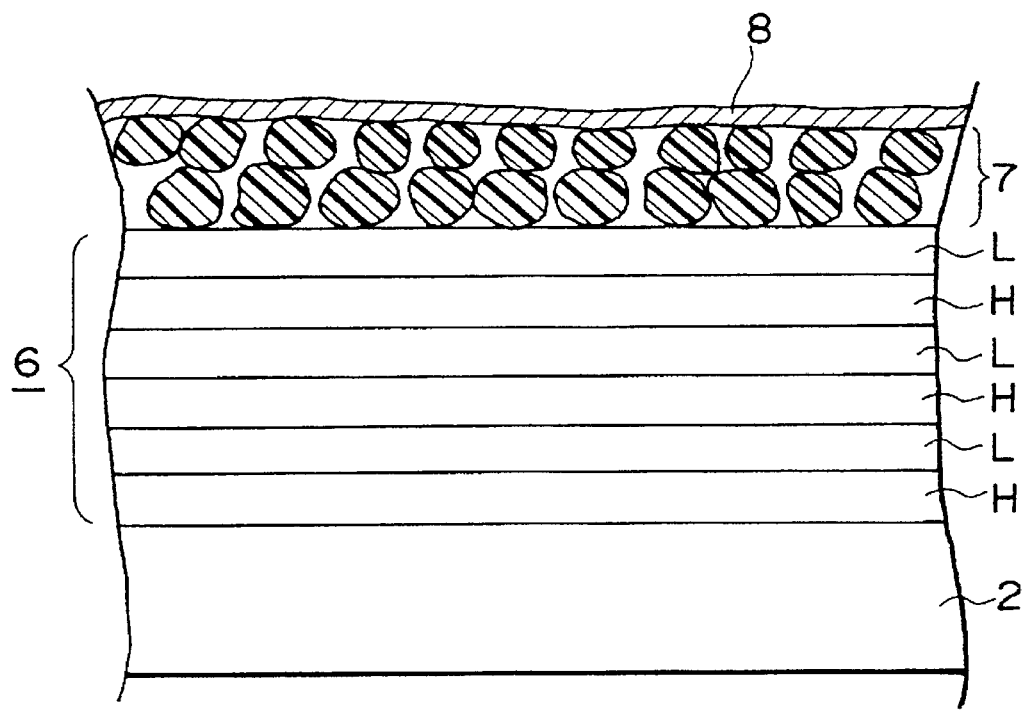
FIG. 2 is an enlarged fragmentary cross section of a glass face panel and a fluorescent plate of the projection cathode-ray tube shown in FIG. 1.
Figure 3:
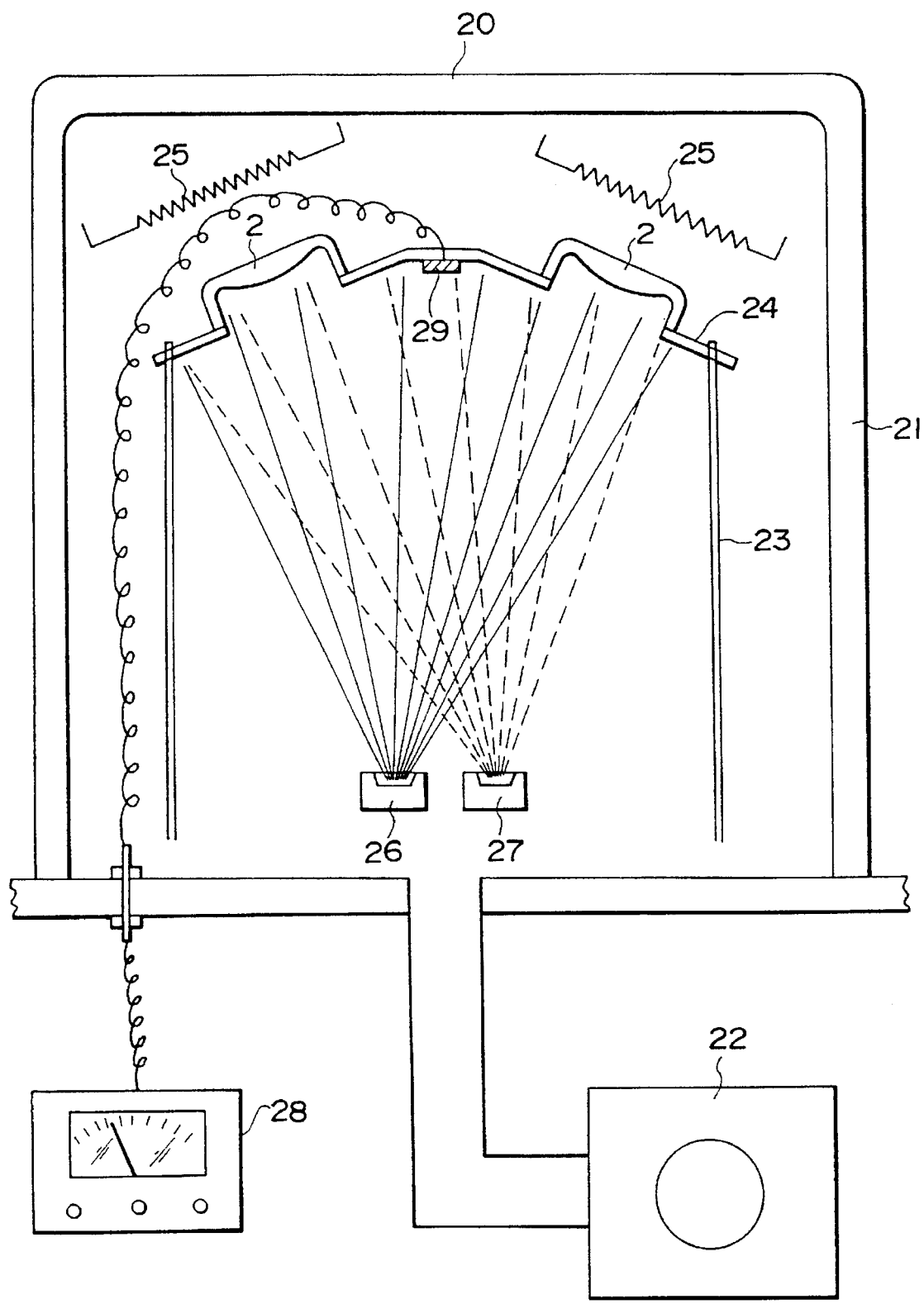
FIG. 3 is a schematic cross sectional view of a conventional vacuum evaporator.
Figure 4:
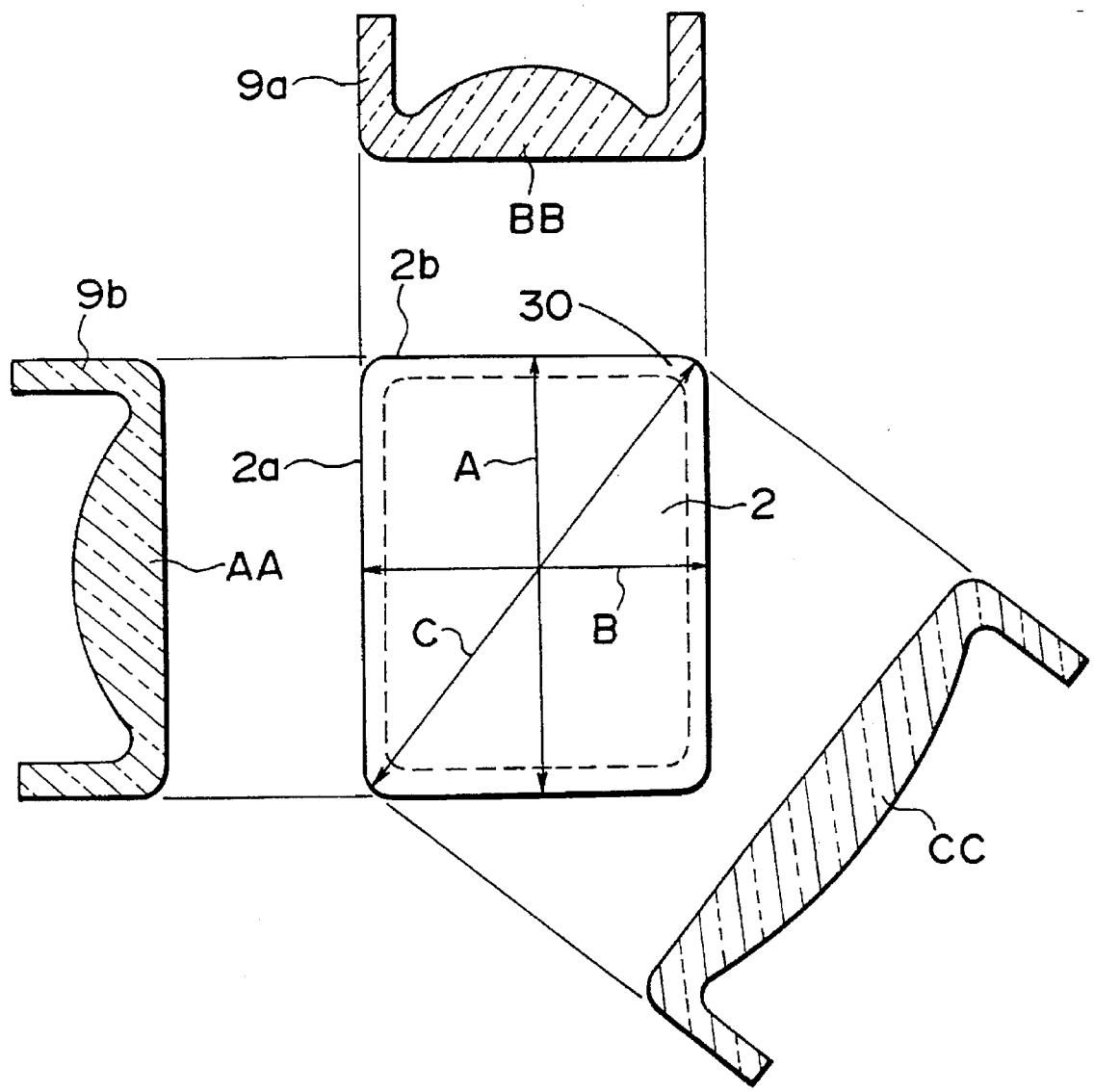
FIG. 4 shows cross sections of the glass face panel shown in FIG. 1 in directions of some axes.
Figure 5:
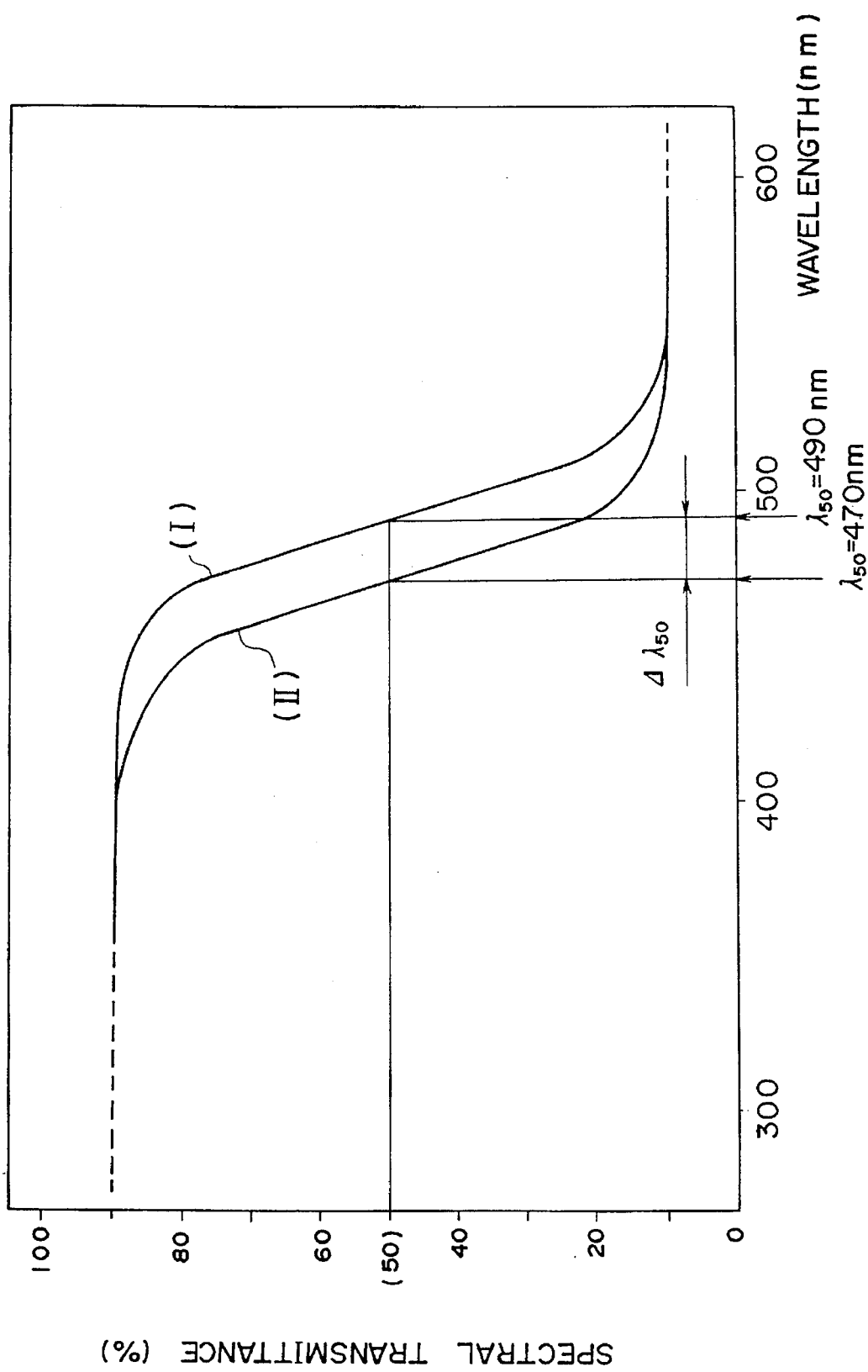
FIG. 5 is a graphical representation showing spectral transmittance of a conventional optical multiple layered interference film.
Figure 6:
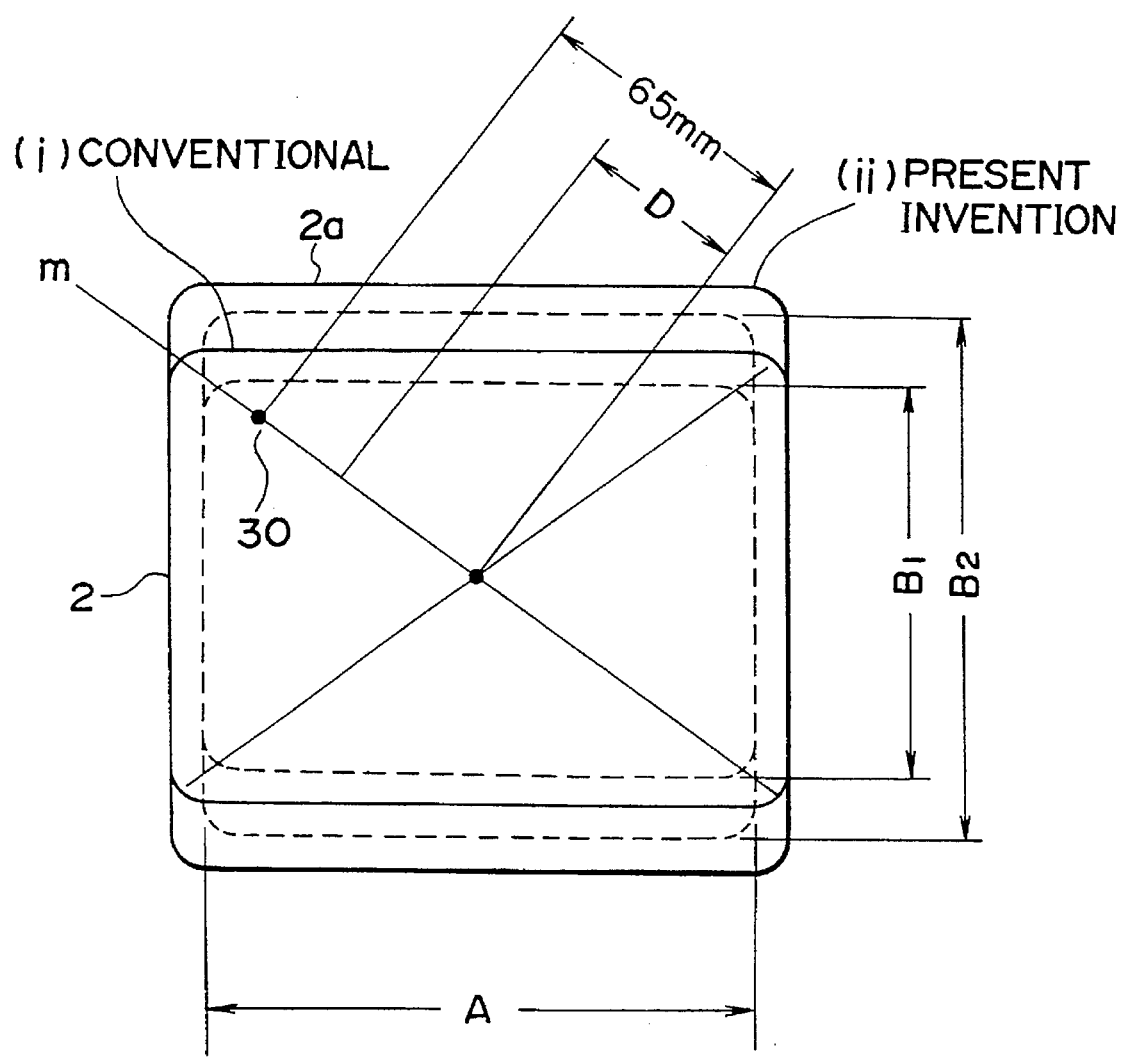
FIG. 6 is an elevational view of a projection cathode-ray tube according to the present invention along with a conventional projection cathode-ray tube for comparison.

Referring now to the drawings, wherein like reference characters designate like or corresponding parts throughout the several views and thus the repeated description thereof can be omitted for brevity, there is shown in FIG. 6 one embodiment of a projection cathode-ray tube with an optical multiple layered interference film according to the present invention along with a conventional projection cathode-ray tube externally measuring 7 inches diagonal across with an optical multiple layered interference film.

As shown in FIG. 6, in the conventional projection cathode-ray tube measuring 7 inches (i) with the optical multiple layered interference film, a ratio between the long edge length A and the short edge length B of the inner surface of the glass face panel 2 formed with the optical multiple layered interference film is approximately 0.75. This is derived from an aspect ratio of 4:3 in a normal television image. In this case, the distribution of wavelength difference $\Delta\lambda_{50}$ of 50% of spectral transmittance between the wavelength $\lambda_{50}$ at the center and a point on a diagonal axis m is shown by a curve (a) in a graph in FIG. 7.

In the conventional 7 inches projection cathode-ray tube with the optical multiple layered interference film, the diagonal length of the effective raster area in operation is 130 mm, and by converting this value into a distance from the center of the glass face panel 2, it is 65 mm. As shown in FIGS. 6 and 7, at this point (D=65 mm), the wavelength difference $\Delta\lambda_{50}$ is −36 nm, and this value is far beyond the limit of the white uniformity in the operation of the projection television set. Hence, it is difficult to ensure the white uniformity.

According to the present invention, while the long edge length A of the inner surface of the glass face panel is fixed, only the short edge length B is enlarged. In this embodiment, by enlarging the short edge length B, the bad influence given to the film thickness distribution of the vacuum evaporation particularly in the diagonal peripheral portions 30 by the long skirts 9a of the long sides 2a of the glass face panel can be largely reduced.

Further, in the projection television set, three projection cathode-ray tubes for three primary colors G, B and R are usually aligned in the direction of the long edge, and by the optical limited conditions, the mounting interval of these tubes should be reduced as small as possible. Hence, it is quite difficult to enlarge the long edge length A of the inner surface of the glass face panel 2 from the present dimension. Accordingly, in the present invention, while the long edge length A is fixed, only the short edge length B is enlarged to improve the unevenness of the film thickness of the vacuum evaporation film in the diagonal peripheral portions 30 due to the influence of the skirts 9.

In FIG. 7, curves (b) to (e) show properties with reference to the short edge length B successively enlarged in a projection cathode-ray tube (ii) with an optical multiple layered interference film according to the present invention, as shown in FIG. 6. The curve (b) shows the case where the short edge length B is enlarged to B/A=0.80, and the wavelength difference $\Delta\lambda_{50}$ is −17 nm at the point D=65 mm on the conventional diagonal axis. The curve (c) shows in the same manner as the curve (b), B/A=0.85 and $\Delta\lambda_{50}$ =−10 nm at the point D=65 mm, and in this instance almost satisfactory white uniformity in the projection television set can be obtained from the above-described experiment results. The curves (d) and (e) show B/A=0.90 and 0.95 and $\Delta\lambda_{50}$=−6 nm and −4 nm, respectively, and excellent white uniformity can be obtained. However, even when the value of B/A is enlarged more than 1.0, the value of $\Delta\lambda_{50}$ cannot be so largely improved.

As a result, in the projection cathode-ray tube with the optical multiple layered interference film, assuming that the long and short edge lengths of an inner surface of a glass face panel 2 are A and B, respectively, by determining $0.85 \leq B/A$, $\Delta\lambda_{50}$ can be at most 10 nm, and the white uniformity of the image reproduced in the projection television set can be held to an almost satisfactory level.

Further, after the experiments with respect to the projection cathode-ray tube measuring not only 7 inches but also 9 inches or 13 inches, it is confirmed that this related formula can be satisfied, and the present invention can be applied to tubes of any size in the same manner as described above.

As described above, according to the present invention, by enlarging the short edge length of the inner surface of the glass face panel in the projection cathode-ray tube with the optical multiple layered interference film, the unevenness of the film thickness of the optical multiple layered interference film in the diagonal peripheral portions of the fluorescent surface or plate due to the skirts of the glass face panel can be improved, and hence the white uniformity of the image reproduced in the projection television set can be largely improved. Hence, a projection cathode-ray tube with a high quality optical multiple layered interference film can be produced at a low cost.

Although the present invention has been described in its preferred embodiments with reference to the accompanying drawings, it is readily understood that the present invention is not restricted to the preferred embodiments and that various changes and modifications can be made by those skilled in the art without departing from the spirit and scope of the present invention.

What is claimed is:

1. A method of manufacturing a projection cathode-ray tube, comprising the steps of:
   (a) providing a glass face panel with a skirt portion, the glass face panel being formed to satisfy the following formula $$0.85 \leq B/A$$

wherein A is a long edge length of the inner surface of the glass face panel and B is a short edge length of the inner surface of the glass face panel;
   (b) mounting the glass face panel on a fixed support so that the glass face panel is fixed; and
   (c) forming a uniformly thick optical multiple layered interference film by alternately evaporating high and low refraction materials onto the inner surface of the glass face panel using at least one fixed evaporation source.

2. The method of claim 1, further comprising the step of (d) forming a fluorescent layer on the optical multiple layered interference film.

3. The method of claim 1, wherein in the step (a) provides the face panel connected to a glass funnel via a glass frit.

4. The method of claim 1, wherein the step (a) provides the glass face panel which is formed to satisfy B/A=0.85.

5. The method of claim 1, wherein the step (a) provides the glass face panel which is formed to satisfy B/A=0.90.

6. The method of claim 1, wherein the step (a) provides the glass face panel which is formed to satisfy B/A=0.95.

7. The method of claim 1, wherein the step (a) provides the glass face panel which is formed to satisfy $0.85 \leq B/A < 1$.

8. A method of manufacturing a projection cathode-ray tube, comprising the steps of:
   (a) providing a glass face panel with a skirt portion, the glass face panel being formed to satisfy the following formula wherein A is a long edge length of the inner surface of the glass face panel and B is a short edge length of the inner surface of the glass face panel, the step (a) providing the glass face panel having a central portion and a peripheral portion;
   (b) mounting the glass face panel on a fixed support so that the glass face panel is fixed; and
   (c) forming, on the inner surface of the glass face panel, an optical multiple layered interference film having a spectral transmittance property represented by a wavelength value at 50% spectral transmittance such that the optical multiple layered interference film at the central portion has a first wavelength value and the optical multiple layered interference film at the peripheral portion has a second wavelength value, and a difference between the first and second wavelength values is less than or equal to 10 nm, the step (c) forming the optical multiple layered interference film by alternately evaporating high and low refraction materials onto the inner surface of the glass face panel using at least one fixed evaporation source.

9. The method of claim 8, wherein the peripheral portions are diagonal peripheral portions.

* * * * *